United States Patent
Khare

(10) Patent No.: US 8,263,518 B2
(45) Date of Patent: Sep. 11, 2012

(54) CATALYST HAVING AN IMPROVED CRUSH STRENGTH AND METHODS OF MAKING AND USING SAME

(75) Inventor: Gyanesh P. Khare, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 527 days.

(21) Appl. No.: 11/956,065

(22) Filed: Dec. 13, 2007

(65) Prior Publication Data

US 2009/0156871 A1 Jun. 18, 2009

(51) Int. Cl.
*B01J 29/62* (2006.01)
(52) U.S. Cl. ............... 502/66; 502/60; 502/63; 502/64; 502/68; 502/74
(58) Field of Classification Search ............ 502/60, 502/63, 66, 70, 74, 79, 64, 68
See application file for complete search history.

(56) References Cited

U.S. PATENT DOCUMENTS

| | | | |
|---|---|---|---|
| 3,216,789 A | | 11/1965 | Breck et al. |
| 3,979,335 A | * | 9/1976 | Golovko et al. ............... 502/68 |
| 4,544,539 A | | 10/1985 | Wortel |
| 4,579,831 A | * | 4/1986 | Field ............................... 502/66 |
| 4,582,815 A | * | 4/1986 | Bowes ............................ 502/64 |
| 4,595,668 A | * | 6/1986 | Poeppelmeier et al. ........ 502/66 |
| 4,595,670 A | | 6/1986 | Tauster et al. |
| 4,721,694 A | | 1/1988 | Buss et al. |
| 5,106,803 A | * | 4/1992 | Mohr et al. ..................... 502/66 |
| 5,318,766 A | | 6/1994 | Vaughan et al. |
| 5,354,933 A | * | 10/1994 | Ohashi et al. ................. 585/419 |
| 5,491,119 A | | 2/1996 | Verduijn |
| 5,514,362 A | | 5/1996 | Miller |
| 5,558,851 A | | 9/1996 | Miller |
| 5,980,731 A | * | 11/1999 | Kao et al. ...................... 208/137 |
| 6,190,539 B1 | * | 2/2001 | Holtermann et al. ......... 208/139 |
| 6,812,180 B2 | * | 11/2004 | Fukunaga ........................ 502/66 |
| 2002/0183192 A1 | * | 12/2002 | Verduijn et al. ................ 502/67 |

OTHER PUBLICATIONS

Tosoh data, 2001 archived data on Tosoh HSZ® 500 KOA L zeolite available at http://web.archive.org/20010407233353/www.Tosoh.com.*
Weibull, "Log Normal Distribution" from http://www.weibull.com.*
Park, et al., "Particle Technology" in Kirk-Othmer Encyclopedia of Chemical Technology, John Wiley, 2007 available on-line Nov. 16, 2007.*
Data on Tosoh HSZ® 500 KOA L zeolite available at http://web.archive.org/ 20010407233353/ www.Tosoh.com which was archived on Apr. 7, 2001.*
"Log Normal Distribution" from http://www.weibull.com available on-line Oct. 6, 2010.*
Fukunaga, Tetsuya, et al., "Halogen-promoted Pt/KL Zeolite Catalyst for the Production of Aromatic Hydrocarbons from Light Naphtha," Catal. Surv. Asia, Jun. 4, 2010,vo1. 14, pp. 96-102, Springer Science+Business Media, LLC, Published on-line Jun. 4, 2010.

* cited by examiner

*Primary Examiner* — In Suk Bullock
*Assistant Examiner* — Bradley Etherton
(74) *Attorney, Agent, or Firm* — Conley Rose, P.C.; Rodney B. Carroll; Chad E. Walter

(57) ABSTRACT

A method of preparing a catalyst comprising selecting a zeolite having a mean particle size of equal to or less than about 6 microns, blending the zeolite with a binder and water to form a paste, shaping the paste into a bound zeolite support, adding a metal to the bound zeolite support to form a metalized catalyst support, and adding at least one halide to the metalized catalyst support to form the catalyst. A catalytic reforming process for converting hydrocarbons to aromatics comprising: contacting a catalyst comprising a silica bound zeolite, a Group VIII metal supported thereby, and at least one halide with a hydrocarbon feed in a reaction zone under reforming conditions and recovering aromatics from the reaction zone, wherein the silica bound zeolite comprises a zeolite having a mean particle size of equal to or less than about 6 microns and a median particle size of equal to or less than about 5 microns.

14 Claims, No Drawings

CATALYST HAVING AN IMPROVED CRUSH STRENGTH AND METHODS OF MAKING AND USING SAME

FIELD OF THE INVENTION

The present disclosure relates to catalyst compositions. More specifically, the present disclosure relates to aromatization catalyst compositions having improved crush strength and methods of producing same.

BACKGROUND OF THE INVENTION

Commercial catalysts require sufficient structural integrity to withstand the process of being loaded into the reactor and to prevent breakup and attrition during the reaction process. A catalyst that loses structural integrity during the course of reactor operation may produce fines which in turn can cause a multitude of problems including for example changes in pressure across the reactor bed, bed channeling, and the plugging of downstream pipes or vessels. A catalyst having poor mechanical and/or physical properties that result in the loss of structural integrity may negatively impact the overall economics of a commercial production process. Thus, there is an ongoing need for catalysts having improved mechanical and physical properties.

SUMMARY OF THE INVENTION

Disclosed herein is a method of preparing a catalyst comprising selecting a zeolite having a mean particle size of equal to or less than about 6 microns, blending the zeolite with a binder and water to form a paste, shaping the paste into a bound zeolite support, adding a metal to the bound zeolite support to form a metalized catalyst support, and adding at least one halide to the metalized catalyst support to form the catalyst.

Also disclosed herein is a catalytic reforming process for converting hydrocarbons to aromatics comprising: contacting a catalyst comprising a silica bound zeolite, a Group VIII metal supported thereby, and at least one halide with a hydrocarbon feed in a reaction zone under reforming conditions and recovering aromatics from the reaction zone, wherein the silica bound zeolite comprises a zeolite having a mean particle size of equal to or less than about 6 microns and a median particle size of equal to or less than about 5 microns.

Further disclosed herein is a method of preparing a zeolitic aromatization catalyst comprising selecting a zeolite having a mean particle size of equal to or less than about 6 microns and a median particle size of equal to or less than about 5 microns, wherein the crush strength of the zeolitic aromatization catalyst is equal to or greater than about 3.0 lb/mm.

Further disclosed herein is a method of preparing a catalyst comprising selecting a L-zeolite having a mean particle size of equal to or less than about 6 microns and a median particle size of equal to or less than about 5 microns, blending the L-zeolite with a silica sol and water to form a paste; wherein a weight ratio of the L-zeolite to the silica is in a range of from about 90:10 to about 70:30, shaping the paste into a bound zeolite support, adding a Group VIII metal to the bound zeolite support to form a metalized catalyst support, and adding chloride and fluoride to the metalized catalyst support to form the catalyst, and wherein the bound zeolite support, the metalized catalyst support, or the catalyst has a crush strength of equal to or greater than about 3.0 lb/mm.

Further disclosed herein is a catalytic reforming process for converting hydrocarbons to aromatics comprising: contacting a silica bound L-zeolite catalyst having a crush strength of equal to or greater than about 3.0 lb/mm with a hydrocarbon feed in a reaction zone under reforming conditions; and recovering aromatics from the reaction zone; wherein the silica bound L-zeolite catalyst further comprises a Group VIII metal, at least one halide and the L-zeolite has a mean particle size of less than or equal to about 6 microns and a median particle size of less than or equal to about 5 microns.

DETAILED DESCRIPTION

Disclosed herein are catalyst compositions having improved mechanical properties and methods of making and using same. In an embodiment, the catalyst composition comprises a zeolite. The zeolite and other components of the catalyst composition will be described in more detail later herein. The catalysts disclosed herein may display desirable mechanical properties such as for example an improved crush strength.

In an embodiment, the catalyst comprises one or more zeolites that are bound together by a binder material. The term "zeolite" generally refers to a particular group of hydrated, crystalline metal aluminosilicates. These zeolites exhibit a network of $SiO_4$ and $AlO_4$ tetrahedra in which aluminum and silicon atoms are crosslinked in a three-dimensional framework by sharing oxygen atoms. In the framework, the ratio of oxygen atoms to the total of aluminum and silicon atoms is equal to 2. The framework exhibits a negative electrovalence that typically is balanced by the inclusion of cations within the crystal such as metals, alkali metals, alkaline earth metals, or hydrogen. Thus, zeolites are a group of natural or synthetic hydrated aluminosilicate minerals that typically contain alkali and alkaline metals. Zeolites are characterized by a framework structure that encloses interconnected cavities occupied by ion-exchangeable large metal cations such as potassium and water molecules permitting reversible dehydration. The actual formula of the zeolite may vary without changing the crystalline structure. In an embodiment, the mole ratio of silicon to aluminum (Si/Al) in the zeolite may vary from about 1.0 to about 3.5.

In an embodiment, the catalyst comprises a large-pore zeolite. The term "large-pore zeolite" as used herein refers to a zeolite having an effective pore diameter of from about 6 Angstroms (Å) to about 15 Å, alternatively from about 7 Å to about 9 Å. Large pore crystalline zeolites suitable for use in this disclosure include without limitation L-zeolite, X-zeolite, Y-zeolite, omega zeolite, beta zeolite, ZSM-4, ZSM-5, ZSM-10, ZSM-12, ZSM-20, REY, USY, RE-USY, LZ-210, LZ-210-A, LZ-210-M, LZ-210-T, SSZ-24, ZZA-26, SSZ-31, SSZ-33, SSZ-35, SSZ-37, SSZ-41, SSZ-42, SSZ-44, MCM-58, mordenite, faujasite, or combinations thereof. In an embodiment, the large pore zeolite has an isotypic framework structure. In an embodiment, the catalyst comprises L-zeolite.

L-type zeolite catalysts are a sub-group of zeolitic catalysts. Typical L-type zeolites contain mole ratios of oxides in accordance with the following formula:

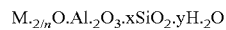

$$M_{2/n}O.Al_2O_3.xSiO_2.yH_2O$$

wherein "M" designates at least one exchangeable cation such as barium, calcium, cerium, lithium, magnesium, potassium, sodium, strontium, and zinc as well as non-metallic cations like hydronium and ammonium ions which may be replaced by other exchangeable cations without causing a substantial alteration of the basic crystal structure of the L-type zeolite. The "n" in the formula represents the valence of "M", "x" is 2 or greater; and "y" is the number of water molecules contained in the channels or interconnected voids with the zeolite. L-zeolite, its X-ray diffraction pattern, its properties, and methods for its preparation are described in detail in, U.S. Pat. No. 3,216,789, the content of which is hereby incorporated by reference. In an embodiment, the catalyst comprises L-zeolite wherein M is potassium and is hereafter referred to as KL-zeolite.

In an embodiment, the catalyst comprises a zeolite, e.g., KL-zeolite, having a mean particle size of less than about 6 microns, alternatively less than about 5 microns, alternatively less than about 4 microns, alternatively less than about 3 microns; a median particle size of less than about 5 microns, alternatively less than about 4 microns, alternatively less than about 3 microns, alternatively less than about 2 microns; or combinations thereof. Zeolites having the disclosed mean and median particle sizes may be prepared by one of ordinary skill in the art using known methodologies for the preparation of a zeolite. For example, the zeolite may be prepared by techniques such as spray drying or crystallization. In an embodiment, the zeolite may then be contacted with other components to form a catalyst.

In an embodiment the binder for use with the zeolite comprises synthetic or naturally occurring zeolites; alumina; clays such as montmorillonite and kaolin; the refractory oxides of metals of Groups IVA and IVB of the Periodic Table of the Elements; oxides of silicon, titanium, zirconium; or combinations thereof. In an embodiment, the binder comprises silica. In an embodiment, the silica particles may be in the form of a silica sol. A silica sol may be obtained by dispersing the silica particles in water. The silica sol may be provided in about 20 to about 30 wt % aqueous solution having a pH of from about 9.0 to about 10.5 with a viscosity of equal to or less than about 20 mPa.s at 25° C., alternatively from about 1 to about 20 mPa.s at 25° C.

In an embodiment, a method for the preparation of a catalyst comprises blending a zeolite of the type disclosed herein, a binder of the type disclosed herein, and water to form a paste and shaping the paste into a silica bound zeolite support, which may also be referred to herein as the catalyst base or catalyst support. The method for preparation of a catalyst may further comprise impregnating the catalyst support with one or more catalytic compounds such as a Group VIII metal (e.g., platinum) and one or more halides (e.g., chloride and fluoride). The catalyst may be used in reforming processes such as for example, the conversion of hydrocarbons to aromatics.

The zeolite and binder (e.g., silica) may be combined in a weight ratio of from about 95:5 to about 50:50 zeolite:binder; alternatively from about 90:10 to about 70:30 zeolite:binder; alternatively from about 88:12 to about 78:22 zeolite:binder. The amount of water necessary to form an extrudable paste may be determined by one of ordinary skill in the art. In an embodiment, the amount of water necessary to form an extrudable paste comprising zeolites having a mean and median particle size within the disclosed ranges is reduced in comparison to an otherwise identical catalyst comprising zeolites having a mean and median particle size outside the disclosed ranges.

The amount of water may be sufficient to form a paste having a dough-like consistency. Such a paste may be characterized by a resistance to crumbling (e.g., not brittle) and the ability to maintain a cohesive form (e.g., not a soup-like consistency). The paste may be further characterized by an ability to form a plug at the die interface, which can then be expelled out through die openings in a cylindrical shape form resembling spaghetti strands.

In an embodiment, the paste is formed into shaped particles. In an embodiment, the paste may be formed into any suitable shape. Methods for shaping the paste are well known in the art, and include, for example, extrusion, spray drying, pelletizing, agglomerization and the like. In an embodiment, the paste is formed into an extrudate, for example as described in U.S. Pat. Nos. 5,558,851 and 5,514,362 each of which are incorporated herein in their entirety. In an embodiment, the paste further comprises an extrusion aid. An extrusion aid may function to improve the rheology of the paste. This improvement in the rheology of the paste may function to improve flow of the paste through the extrusion die. Improved flow through the extrusion die leads to easier equipment start-up, smoother extrusion, faster processing, lower extrusion pressures, and improved product appearance. In an embodiment, the extrusion aid may comprise cellulose based materials, ethylene glycol, stearic acid, or combinations thereof. In an embodiment, the extrusion aid comprises a cellulose ether such as methylcellulose, carboxymethylcellulose, ethylhydroxyethylcellulose, hydroxyethylcellulose, hydroxypropylcellulose, methylhydroxyethylcellulose, methylhydroxypropylcellulose, or combinations thereof. An example of an extrusion aid suitable for use in this disclosure includes without limitation METHOCEL®, a cellulose based material commercially available from Dow Chemical Company. Extrusion aids, their effective amounts and methods of incorporation into a catalyst base composition may be varied and selected according to ordinary skill in the art. Hereafter the shaped paste exiting a die will be referred to as the "green extrudate."

Excess water from the green extrudate may be removed by drying to form a dried green extrudate prior to further processing. Conventional methods for drying wet solids can be used to dry the green extrudate, and may include, for example drying in air or an inert gas such as nitrogen or helium. Drying temperatures may range from about 200° F. to about 400° F., alternatively from about 200° F. to about 300° F., alternatively from about 225° F. to about 275° F. Drying times may range from equal to or greater than about 1 hour, alternatively from about 1 hour to about 10 hours, alternatively from about 2 hours to about 5 hours.

In an embodiment, the dried green extrudate may be calcined to form a calcined extruded base (CEB). Calcination temperatures may range of from about 500° F. to about 1500° F., alternatively from about 700° F. to about 1100° F., alternatively from about 850° F. to about 1100° F. Calcination times may range from about 0.5 to about 5 hours, alternatively from about 0.5 to about 1.5 hours. In such embodiments, the calcination may be carried out in an oxygen containing atmosphere having a flow rate of from about 10 to about 20 cubic feet per hour (CFH), alternatively the calcination may be carried out in air at a flow rate of from about 10 to about 20 CFH, alternatively, the calcination may be carried out in "dry" air having a flow rate of about 10 to about 20 CFH. Herein dry air refers to air having a dew point of less than about −40° F. In an embodiment, the calcined extruded base may be used as a bound zeolite support.

In an embodiment, the CEB may be washed to form a washed CEB. Washing the CEB may reduce the amount of "readily removable" alkali that may be present. The term washing, as used herein, is meant to include any process where liquid (e.g. water) in excess of the material's pore volume is contacted with the CEB. The "readily removable" alkali is defined herein as the alkali that can be washed out of the CEB after 5 washings by contacting an about 1:1 volume of liquid to weight of extrudate at ambient temperature. Several washings may be necessary in order to substantially reduce the amount of readily removable alkali. In some embodiments, the CEB may be subjected to at least 5 washings in order to remove a substantial amount of the readily removable alkali. In an embodiment, the wash water is distilled or deionized water having a pH of from about 5 to about 9. The washing temperature may range from about 70° F. to about 200° F., alternatively of from about 80° F. to about 130° F., alternatively from about 90° F. to about 110° F. The washing time may range from about 5 to about 60 minutes per wash, alternatively from about 15 to about 30 minutes per wash.

In an embodiment, potassium ions ($K^+$) may be incorporated in the wash liquid (e.g., water) to neutralize any protonic sites that may have formed during washing and/or to prevent the formation of protonic sites. Any suitable K-containing compound soluble in water may be used including, but not limiting, KOH, $KNO_3$, $KHCO_3$, $K_2CO_3$, K-acetate, K-salts of common organic acids such as oxalic, citric, acetic, propionic, and the like. The $K^+$ may be present in amounts of ranging from about 100 to about 1000 ppm. Protonic or Bronsted acid sites may result in acidic properties with adverse effect on the catalyst activity and/or deactivation rate.

After washing to reduce the amount of readily removable alkali, the CEB may be dried to form a washed and dried CEB. The drying temperature may range from about 200° F. to about 400° F., alternatively from about 200° F. to about 300° F., alternatively from about 225° F. to about 275° F. The drying time may range from at least about 1 hour, alternatively from about 1 to about 10 hours, alternatively from about 2 to about 5 hours.

The washed and dried CEB may be recalcined to form a washed, dried, and recalcined CEB. The calcining temperature may range from about 500° F. to about 1200° F., alternatively from about 700° F. to about 1100° F., alternatively from about 850° F. to about 1000° F. The calcining time may range from about 0.5 to about 5.0 hours, alternatively from about 0.5 to about 1.5 hours. In such embodiments the calcination may be carried out in an oxygen containing atmosphere having a flow rate of from about 10 to about 20 CFH, alternatively the calcination may be carried out in air at a flow rate of from about 10 to about 20 CFH, alternatively, the calcination may be carried out in "dry" air having an flow rate of about 10 to about 20 CFH. In an embodiment, the washed, dried, and recalcined CEB may be used as a bound zeolite support.

The catalyst support having been processed as previously disclosed herein may be further processed to add one or more catalytic materials to the catalyst support. In an embodiment, the addition of a metal and one or more halides to the catalyst support forms a catalyst capable of catalyzing reactions such as the conversion of hydrocarbons to aromatics.

In an embodiment, one or more Group VIII metals are added to the catalyst support to form a metalized catalyst support. The metal may be added to the catalyst support by employing a variety of known and conventional techniques, e.g., ion-exchange, incipient wetness, pore fill, impregnation, etc. In an embodiment, the metal is added to the catalyst support by impregnation with a metal-containing solution. The metal in the metal containing solution may be at least one Group VIII metal; alternatively, Pt, Pd, Rh, Ir, Ru, Os, or combinations thereof; alternatively, platinum. In an embodiment, the metal comprises platinum that is added to the catalyst support via contact with a metal-containing solution containing at least one platinum-containing compound. Examples of suitable platinum-containing compounds for contact with the catalyst support include without limitation platinum compounds that form positively charged platinum complex ions in solution such as for example platinum salts such as chlorides and nitrates; platinum complexes with ammines; or combinations thereof. For example, the platinum-containing compound can be any decomposable platinum-containing compound including, but not limited to, ammonium tetrachloroplatinate, chloroplatinic acid, diammineplatinum (II) nitrite, bis-(ethylenediamine)platinum (II) chloride, platinum (II) acetylacetonate, dichlorodiammine platinum, platinum (II) chloride, tetraammineplatinum (II) hydroxide, tetraammineplatinum chloride, and tetraammineplatinum (II) nitrate. In an embodiment, the platinum source is tetraammine platinum chloride (TAPC). The amount of platinum in the metalized catalyst support may range from about 0.1 to about 5 wt. %, alternatively from about 0.1 to about 3 wt. %, alternatively from about 0.3 to about 1.8 wt. %.

In an embodiment, one or more halides are added to the catalyst support by contact with a halide-containing compound to form a halided catalyst support. The halides may be added into the catalyst support separately; alternatively, the halides may be added to the catalyst support at the same time. Such halides may be incorporated during addition of a metal, alternatively the halides are incorporated in a separate step that may be pre- or post addition of the metal, to form a halided, metalized catalyst support. Examples of suitable halides include without limitation fluoride, chloride, bromide, iodide, or combinations thereof. Such halides may be introduced as the organic ammonium halide compound. The organic ammonium halide compound may comprise one or more compounds represented by the formula $N(R)_4X$, where X is a halide and where R represents a hydrogen or a substituted or unsubstituted carbon chain molecule having 1-20 carbons wherein each R may be the same or different. In an embodiment, R is selected from the group consisting of methyl, ethyl, propyl, butyl, and combinations thereof, more specifically methyl. Examples of suitable organic ammonium compound is represented by the formula $N(R)_4X$ include ammonium chloride, ammonium fluoride, and tetraalkylammonium halides such as tetramethylammonium chloride (TMAC), tetramethylammonium fluoride (TMAF), tetraethylammonium chloride, tetraethylammonium fluoride, tetrapropylammonium chloride, tetrapropylammonium fluoride, tetrabutylammonium chloride, tetrabutylammonium fluoride, methyltriethylammonium chloride, methyltriethylammonium fluoride, or combinations thereof. In an embodiment, the halided metalized catalyst support comprises chloride present in an amount of from about 0.1 to about 5 wt. %, alternatively from about 0.1 to about 3 wt. %, alternatively from about 0.3 to about 1.8 wt. %. In an embodiment, the halided metalized catalyst support comprises fluoride present in an amount of from about 0.1 to about 5 wt. %, alternatively from about 0.1 to about 3 wt. %, alternatively from about 0.3 to about 1.8 wt. %. In an embodiment, the halided metalized catalyst support comprises both chloride and fluoride, which may be present in a Cl:F ratio of from about 1:10 to 10:1, alternatively from about 1:5 to 5:1 alternatively from about 1:2 to 2:1. In an embodiment, the halided metalized catalyst support is allowed to set for several hours prior to additional processing. In an embodiment, the halided metalized catalyst support is allowed to set for about 1 to about 24 hours, alternatively for about 2 to about 8 hours, alternatively for about 3 to about 6 hours. In an embodiment, the catalyst comprises a metalized, halided support.

Following impregnation of the catalyst support with a metal and one or more halides to form a halided metalized catalyst support, the halided metalized catalyst support may then be further processed as described herein. The halided metalized catalyst support may be processed to remove undesirable compounds remaining from the impregnation steps, for example by drying to remove compounds and/or heating to decompose compounds. In an embodiment, the halided metalized catalyst support is dried, and calcined as described previously.

The halided metalized catalyst support may be dried to form a dried halided metalized catalyst support. The drying temperature may ranging from about 100° F. to about 300° F., alternatively from about 150° F. to about 250° F., alternatively from about 200° F. to about 220° F. The drying time may range from about 0.1 to about 6 hours, alternatively for from about 0.2 to about 4 hours, alternatively for from about 0.2 to about 3 hours. The halided metalized catalyst support may be dried using any equipment known to one of ordinary skill in the art for drying under the disclosed conditions. For example, the halided metalized catalyst support may be dried using a standard rotary evaporator operating at greater than about 100° F., under a pressure of about 30 inches of mercury.

The dried halided metalized catalyst support may be calcined to form a dried, and calcined halided metalized catalyst support. The calcining temperature may range from about 400° F. to about 900° F., alternatively from about 500° F. to about 700° F., alternatively from about 550° F. to about 600° F. The calcining time may range from about 0.5 to about 5 hours, alternatively from about 0.5 to about 2.5 hours. The calcination may be carried out in an oxygen containing atmosphere under a flow rate of from about 5 to about 20 CFH. Alternatively, the calcination may be carried out in air using a flow rate of from about 5 to about 20 CFH, alternatively in dry air using a flow rate of about 5 to about 20 CFH. Upon completion of processing the halided metalized catalyst support (e.g., washing, drying, and calcining), the processed halided metalized catalyst support may be employed as a catalyst in a suitable chemical reaction and process.

In an embodiment, the catalyst support and/or the catalyst has an increased crush strength when compared to an otherwise identical catalyst support and/or catalyst produced from a zeolite having a mean and median particle size outside of the ranges disclosed herein. Herein the crush strength is defined as the resistance of the catalyst support and/or catalyst to compressive forces. Measurements of crush strength are intended to provide an indication of the ability of the catalyst to maintain its physical integrity during handling and use. In an embodiment, the catalyst support and/or catalyst has a crush strength of equal to or greater than about 3.0 lb/mm, alternatively equal to or greater than about 3.5 lb/mm, alternatively equal to or greater than about 3.8 lb/mm. In an embodiment, the crush strength is determined in accordance with ASTM method D 6175-98 "Standard Test Method for Radial Crush Strength of Extruded Catalyst" with the exception that the force applied to the sample is applied laterally. Without wishing to be limited by theory the use of zeolite particles having a mean and median particle size within the disclosed ranges may allow for advantageous packing of the catalyst structure that minimizes the amount of water necessary to form an extrudable paste. As will be understood by one of ordinary skill in the art, thermal treatment of the extrudable paste may result in dehydration of the paste and the formation of voids in the catalyst structure due to the loss of water molecules. A reduction in the amount of water required to form an extrudable paste reduces the voids formed by dehydration of the catalyst during subsequent thermal treatment and may result in an improved crush strength.

In an embodiment, the catalyst support and/or catalyst has an increased density when compared to an otherwise identical catalyst support and/or catalyst produced from a zeolite having a mean and median particle size outside of the ranges disclosed herein. Without wishing to be limited by theory, the higher density of the disclosed catalyst and/or catalyst support may provide a higher amount of activity per unit volume of commercial reactors. In an embodiment, the particle density of the catalyst and/or catalyst support may range from about 1.0 to about 1.3 g/cc; alternatively from about 1.08 to about 1.22 g/cc; alternatively from about 1.14 to about 1.18 g/cc. In an embodiment, the bulk density of the catalyst and/or catalyst support may range from about 35 to about 47 lb/ft$^3$; alternatively from about 39 to about 43 lb/ft$^3$.

In an embodiment, the catalyst prepared as disclosed herein is used as a catalyst in an aromatization reactor system comprising at least one aromatization reactor and its corresponding processing equipment. As used herein, the terms "aromatization," "aromatizing" and "reforming" refer to the treatment of a hydrocarbon feed to provide an aromatics enriched product, which in one embodiment is a product whose aromatics content is greater than that of the feed. Typically, one or more components of the feed undergo one or more reforming reactions to produce aromatics. Some of the hydrocarbon reactions that occur during the aromatization operation include the dehydrogenation of cyclohexanes to aromatics, dehydroisomerization of alkylcyclopentanes to aromatics, dehydrocyclization of acyclic hydrocarbons to aromatics, or combinations thereof. A number of other reactions also occur, including the dealkylation of alkylbenzenes, isomerization of paraffins, hydrocracking reactions that produce light gaseous hydrocarbons, e.g., methane, ethane, propane and butane, or combinations thereof.

The aromatization reaction occurs under process conditions that thermodynamically favor the dehydrocyclization reaction and limit undesirable hydrocracking reactions. The pressures may be from about 0 pounds per square inch gauge (psig) to about 500 psig, alternatively from about 25 psig to about 300 psig. The molar ratio of hydrogen to hydrocarbons may be from about 0.1:1 to about 20:1, alternatively from about 1:1 to about 6:1. The operating temperatures include reactor inlet temperatures from about 700° F. to about 1050° F., alternatively from about 900° F. to about 1000° F. Finally, the liquid hourly space velocity for the hydrocarbon feed over the aromatization catalyst may be from about 0.1 to about 10, alternatively from about 0.5 to about 2.5.

The composition of the feed is a consideration when designing catalytic aromatization systems. In an embodiment, the hydrocarbon feed comprises non-aromatic hydrocarbons containing at least six carbon atoms. The feed to the aromatization system is a mixture of hydrocarbons comprising $C_6$ to $C_8$ hydrocarbons containing up to about 10 wt % and alternatively up to about 15 wt % of $C_5$ and lighter hydrocarbons ($C_5^-$) and containing up to about 10 wt % of $C_9$ and heavier hydrocarbons ($C_9^+$). Such low levels of $C_9^+$ and $C_5^-$ hydrocarbons maximize the yield of high value aromatics. In some embodiments, an optimal hydrocarbon feed maximizes the percentage of $C_6$ hydrocarbons. Such a feed can be achieved by separating a hydrocarbon feedstock such as a full range naphtha into a light hydrocarbon feed fraction and a heavy hydrocarbon feed fraction, and using the light fraction.

In another embodiment, the feed is a naphtha feed. The naphtha feed may be a light hydrocarbon, with a boiling range of about 70° F. to about 450° F. The naphtha feed may contain aliphatic, naphthenic or paraffinic hydrocarbons. These aliphatic and naphthenic hydrocarbons are converted, at least in part, to aromatics in the aromatization reactor system. While catalytic aromatization typically refers to the conversion of naphtha, other feedstocks can be treated as well to provide an aromatics enriched product. Therefore, while the conversion of naphtha is one embodiment, the present disclosure can be useful for activating catalysts for the conversion or aromatization of a variety of feedstocks such as paraffinic hydrocarbons, olefinic hydrocarbons, acetylenic hydrocarbons, cyclic paraffin hydrocarbons, cyclic olefin hydrocarbons, and mixtures thereof, and particularly saturated hydrocarbons.

In an embodiment, the feedstock is substantially free of sulfur, nitrogen, metals, and other known poisons for aromatization catalysts. In an embodiment, the feedstock contains less than about 100 ppb of sulfur. If present, such poisons can be removed using methods known to those skilled in the art. In some embodiments, the feed can be purified by first using conventional hydrofining techniques, then using sorbents to remove the remaining poisons. Such hydrofining techniques and sorbents are included in the purification process described below.

The methodologies for preparation of a catalyst of the type disclosed herein may provide a catalyst with sufficient particle strength suitable for use in a fixed, fluidized, or moving catalyst bed. For example, a catalyst comprising from about 95:5 to about 50:50 zeolite:silica weight ratio; alternatively from about 90:10 to about 70:30 zeolite:silica weight ratio; alternatively about 88:12 to about 78:22 zeolite:silica weight ratio; may be sufficiently robust to withstand the fixed, fluidized, or moving catalyst bed employed in a continuous catalyst regeneration process, in contrast to an otherwise identical catalyst comprising a zeolite having a mean and median particle size outside the ranges disclosed herein.

EXAMPLES

The invention having been generally described, the following examples are given as particular embodiments of the invention and to demonstrate the practice and advantages thereof. It is understood that the examples are given by way of illustration and are not intended to limit the specification of the claims to follow in any manner.

Example 1

A reformer catalyst having a support composition of about 83:17 wt/wt L-zeolite:silica sol was prepared by first mixing the two components in a mixer with some additional water added to produce an extrudable paste and then extruding using a lab piston extruder. The extruded particulates were dried at about 250° F. for about 4 hours and then calcined in air at about 932° F. for 1 hour. Physical and mechanical properties of samples comprising zeolitic material having particle sizes in the disclosed ranges (Samples A and B) are compared to a control sample comprising zeolitic material having particle sizes outside the disclosed ranges, Table 1. The particle size of the zeolitic material was measured using a Horiba LA-920 laser scattering particle size analyzer. In a typical measurement, approximately about 100 mg of mixed sample was transferred to a beaker and diluted to about 25 ml with isopropanol. The sample was then sonicated in a bath for about one minute, stirred, and then a portion is transferred to the analyzers flow system containing isopropanol with a circulation speed of 5. The sample is then measured after the distribution has stabilized

TABLE 1

| Property | Sample A | Sample B | Control |
|---|---|---|---|
| Surface Area $M^2/g$ | 333 | 334 | 286 |
| Mean particle size, micron | 6 | 1.4 | 12.4 |
| Median Particle Size, micron | 1.7 | 2.5 | 11.2 |
| Extrusion | | | |
| Additional water required, g | 30 | 30 | 91 |
| Extrusion mix, % volatile @ 1000° F. | 34.8 | 34.5 | 37.7 |

TABLE 1-continued

| Property | Sample A | Sample B | Control |
|---|---|---|---|
| Calcined Base | | | |
| Crush Strength, lb/mm | 3.8 | 3.8 | 2.8 |
| Particle density, g/cc | 1.17 | 1.16 | 1.12 |
| Bulk Density, $lb/ft^3$ | 42.7 | 42.2 | 41.3 |

The results demonstrate that catalysts comprising zeolites having a mean particle size of equal to or less than about 6 microns and a median particle size of less than about 5 microns show both a reduction in the amount of water necessary to form an extrudable paste and an improved crush strength.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the disclosure is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:
1. A method of preparing a catalyst comprising:
selecting a zeolite having a mean particle size ranging from equal to or greater than 1.4 microns to equal to or less than about 6 microns and a median particle size of equal to or less than about 5 microns wherein the zeolite comprises an L-zeolite;
blending the zeolite with a binder and water to form a paste wherein the paste has a dough-like consistency and is characterized by a resistance to crumbling and the ability to maintain a cohesive form;
shaping the paste into a bound zeolite support;
adding a metal to the bound zeolite support to form a metalized catalyst support; and
adding at least one halide to the metalized catalyst support to form the catalyst.

2. The method of claim 1 wherein the binder comprises synthetic or naturally occurring zeolites, alumina, silica, clays, or combinations thereof.

3. The method of claim 1 wherein the catalyst has a weight ratio of the zeolite to the binder in a range of from about 90:10 to about 70:30.

4. The method of claim 1 wherein the catalyst has a particle density in a range of from about 1 to about 1.3 g/cc.

5. The method of claim 1 wherein the bound zeolite support, the metalized catalyst support, or the catalyst thereof have a crush strength of equal to or greater than about 3.0 lb/mm.

6. The method of claim 1 wherein the amount of water used to form the paste is reduced when compared to an otherwise identical paste with the mean particle size of the zeolite is greater than about 6 microns.

7. The method of claim 1 wherein the metal comprises a Group VIII metal.

8. The method of claim 1 wherein the metal comprises platinum.

9. The method of claim 1 wherein the at least one halide comprises fluoride, chloride, bromide, iodide, or combinations thereof.

10. A method of preparing a catalyst comprising:
selecting a L-zeolite having a mean particle size ranging from equal to or greater than 1.4 microns to equal to or less than about 6 microns and a median particle size of equal to or less than about 5 microns;
blending the L-zeolite with a silica sol and water to form a paste wherein the paste has a dough-like consistency and is characterized by a resistance to crumbling and the ability to maintain a cohesive form; wherein a weight ratio of the L-zeolite to the silica is in a range of from about 90:10 to about 70:30;
shaping the paste into a bound zeolite support;
adding a Group VIII metal to the bound zeolite support to form a metalized catalyst support; and
adding chloride and fluoride to the metalized catalyst support to form the catalyst;
and wherein the bound zeolite support, the metalized catalyst support; or the catalyst has a crush strength of equal to or greater than about 3.0 lb/mm.

11. The method of claim 10 wherein the catalyst has an improved crush strength over an otherwise similar catalyst having a mean particle size of greater than about 6 microns and a median particle size of greater than about 5 microns.

12. The method of claim 10 wherein the paste further comprises an extrusion aid.

13. The method of claim 10 wherein the catalyst has a bulk density of from about 35 lb/ft$^3$ to about 47 lb/ft$^3$.

14. The method of claim 10 wherein the bound zeolite support, the metalized catalyst support, or the catalyst thereof have a crush strength of equal to or greater than about 3.5 lb/mm.

* * * * *